(12) United States Patent
Decady

(10) Patent No.: US 9,777,699 B1
(45) Date of Patent: Oct. 3, 2017

(54) GRAVITY DRIVEN HYDRO-ELECTRIC SYSTEMS

(71) Applicant: Robillard Decady, Miami, FL (US)

(72) Inventor: Robillard Decady, Miami, FL (US)

(*) Notice: Subject to any disclaimer, the term of this patent is extended or adjusted under 35 U.S.C. 154(b) by 208 days.

(21) Appl. No.: 14/873,623

(22) Filed: Oct. 2, 2015

(51) Int. Cl.
  F03B 13/00 (2006.01)
  H02P 9/04 (2006.01)
  F03B 13/10 (2006.01)
  F03B 13/08 (2006.01)

(52) U.S. Cl.
  CPC ........... *F03B 13/105* (2013.01); *F03B 13/08* (2013.01)

(58) Field of Classification Search
  CPC ................................. F03B 13/08; F03B 13/10
  USPC ............................................. 290/43, 52, 54
  See application file for complete search history.

(56) References Cited

U.S. PATENT DOCUMENTS

| | | | | |
|---|---|---|---|---|
| 4,306,157 A * | 12/1981 | Wracsaricht | .......... | F03B 17/061 290/43 |
| 5,825,094 A * | 10/1998 | Hess | ..................... | F03B 13/105 290/43 |
| 7,214,029 B2 * | 5/2007 | Richter | ................... | F03D 1/025 415/193 |
| 7,340,893 B1 * | 3/2008 | Rowan | .................. | F01K 25/005 60/495 |
| 7,586,207 B2 * | 9/2009 | Sack | ....................... | F03B 13/14 290/53 |
| 8,860,357 B1 * | 10/2014 | Decady | ................. | H01M 16/00 180/2.2 |
| 2007/0035138 A1 * | 2/2007 | Khan | ....................... | B60L 8/00 290/54 |
| 2011/0012361 A1 * | 1/2011 | Lee | .......................... | B60K 7/00 290/55 |
| 2014/0077499 A1 * | 3/2014 | Joo | ....................... | F03B 11/006 290/54 |

* cited by examiner

*Primary Examiner* — Tulsidas C Patel
*Assistant Examiner* — Thomas Quigley
(74) *Attorney, Agent, or Firm* — Albert Bordas, P.A.

(57) ABSTRACT

A gravity driven hydroelectric system, whereby hydroelectric power is developed from potential energy of dammed water driving a water turbine assembly. The hydroelectric power extracted from the water depends on volume and on a difference in height between a source and an outflow of the water. A penstock delivers the water to the water turbine assembly. The penstock has a housing secured by frame assemblies to a structure. The housing has electromagnetic coils that produce electricity from a rotation of turbine blades having magnets.

14 Claims, 7 Drawing Sheets

GRAVITY DRIVEN HYDRO-ELECTRIC SYSTEMS

BACKGROUND OF THE INVENTION

1. Field of the Invention

The present invention relates to generator systems, and more particularly, to gravity driven hydroelectric systems.

2. Description of the Related Art

Hydroelectricity is a term that refers to electricity generated by hydropower, the production of electrical power through the use of a gravitational force of falling or flowing water. It is used as a form of renewable energy, accounting for a percentage of global electricity generation and is expected to increase in the future. The cost of hydroelectricity is relatively low, making it a competitive source of renewable electricity. It is also a flexible source of electricity since the amount produced by a station can be changed up or down quickly to adapt to changing energy demands. Once a hydroelectric complex is constructed, it typically does not produce direct waste, and has a considerably lower output level of the greenhouse gas carbon dioxide than fossil fuel powered energy plants.

Applicant however is not aware of any gravity driven hydroelectric systems having the novel features of the present invention.

SUMMARY OF THE INVENTION

The instant invention is a gravity driven hydroelectric system, comprising a first housing having a sidewall with first and second ends. Extending through the first housing is a shaft. A rotor housing assembly comprises a first hole to accommodate the shaft. A field winding starter assembly comprises second and third holes to accommodate the shaft. The field winding starter assembly further comprises a field winding starter having a first laminated steel rotor. A permanent magnet rotor assembly comprises fourth and fifth holes to accommodate the shaft. The permanent magnet rotor assembly further comprises a permanent magnet rotor. A laminated steel rotor assembly comprises second and third laminated steel rotors fixed upon the shaft and elongated permanent magnets. The elongated permanent magnets extend through the second and third laminated steel rotors. A generator assembly comprises sixth hole and an armature having wire coils. A water turbine assembly is fixedly mounted onto the shaft, thereby rotating together. The water turbine assembly comprises a second housing having seventh and eighth holes to accommodate the shaft. The water turbine assembly further comprises turbine blades having magnets thereon. An electrical system comprises wires that connect to terminals, whereby hydroelectric power is developed from potential energy of dammed water driving the water turbine assembly. The hydroelectric power extracted from the water depends on volume and on a difference in height between a source and an outflow of the water. The present invention further comprises a penstock to deliver the water to the water turbine assembly. The penstock comprises a third housing secured by frame assemblies to a structure. The third housing comprises electromagnetic coils that also produce electricity from a rotation of the turbine blades having the magnets.

The turbine blades having the magnets thereon rotate over electro magnetic coils mounted from the sidewall, or over electro magnetic coils mounted and protruding from the sidewall.

The rotor housing assembly, the field winding starter assembly, the permanent magnet rotor assembly, the laminated steel rotor assembly, and the generator assembly are contained within the first housing. The rotor housing assembly is adjacent to the field winding starter assembly. The field winding starter assembly is positioned in between the rotor housing assembly and the permanent magnet rotor assembly. The permanent magnet rotor assembly is positioned in between the field winding starter assembly and the laminated steel rotor assembly. The laminated steel rotor assembly is positioned in between the permanent magnet rotor assembly and the generator assembly.

It is therefore one of the main objects of the present invention to provide a gravity driven hydroelectric system to produce electrical power through the use of the gravitational force of falling or flowing water.

It is another object of the present invention to provide a gravity driven hydroelectric system as a form of renewable energy.

It is another object of the present invention to provide a gravity driven hydroelectric system as a flexible source of electricity, whereby an amount produced by a station can be changed up or down quickly to adapt to changing energy demands.

It is another object of the present invention to provide a gravity driven hydroelectric system that does not produce direct waste, and has a considerably lower output level of the greenhouse gas carbon dioxide than fossil fuel powered energy plants.

It is another object of the present invention to provide a gravity driven hydroelectric system that develops hydroelectric power from the potential energy of dammed water driving a water turbine and generator assembly.

It is another object of the present invention to provide a gravity driven hydroelectric system whereby power extracted from water depends on a volume and on a difference in height between the source and the water's outflow.

It is another object of this invention to provide a gravity driven hydroelectric system, which is of a durable and reliable construction.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
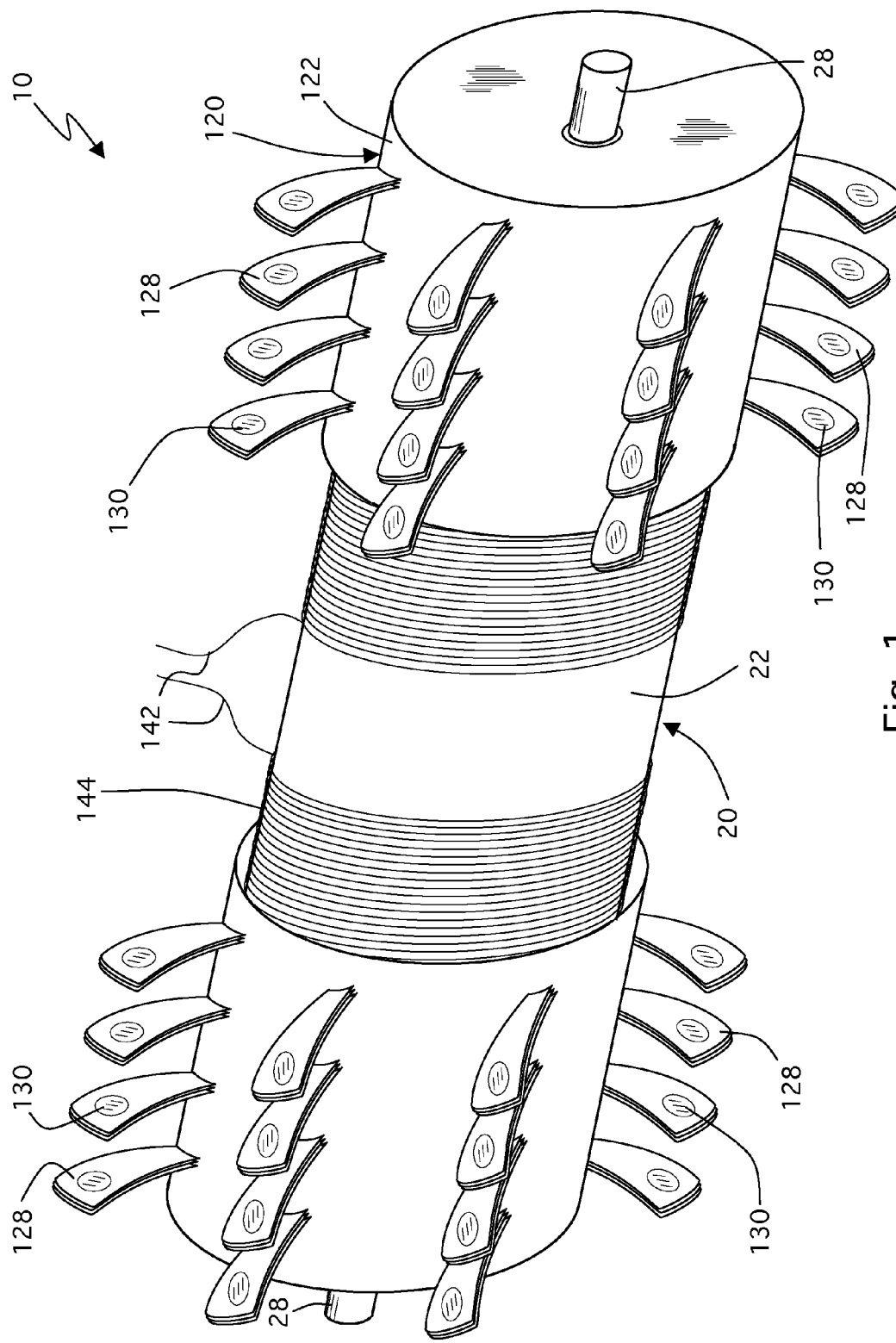
FIG. 1 represents an isometric view of a gravity driven hydroelectric system.

Referring now to the drawings, the present invention is a gravity driven hydroelectric system and is generally referred to with numeral 10. It can be observed that it basically includes housing 20, water turbine assembly 120, and electrical system 140.

Figure 2:
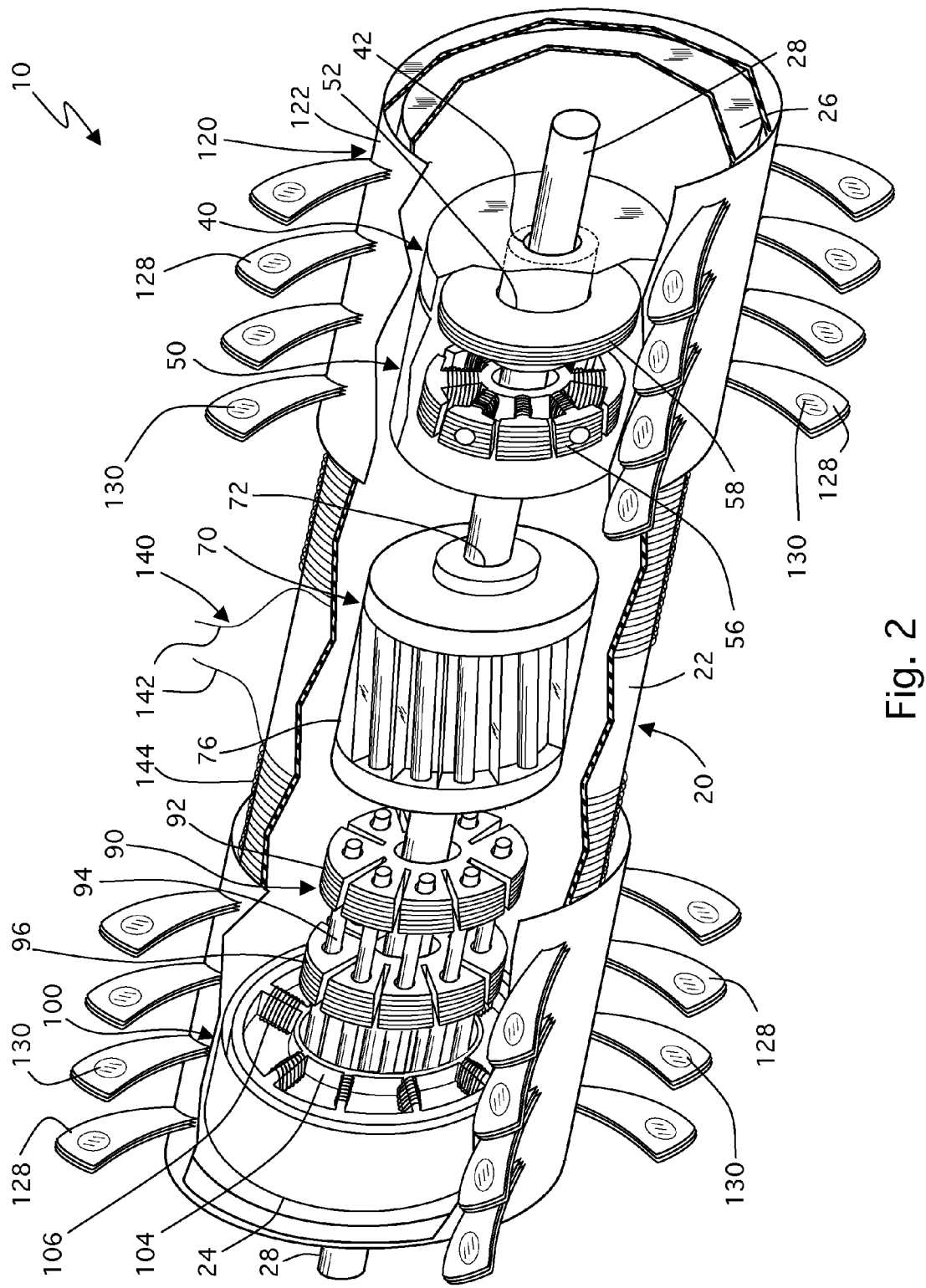
FIG. 2 is a cutaway perspective view of the gravity driven hydroelectric system seen in FIG. 1.
Figure 3:
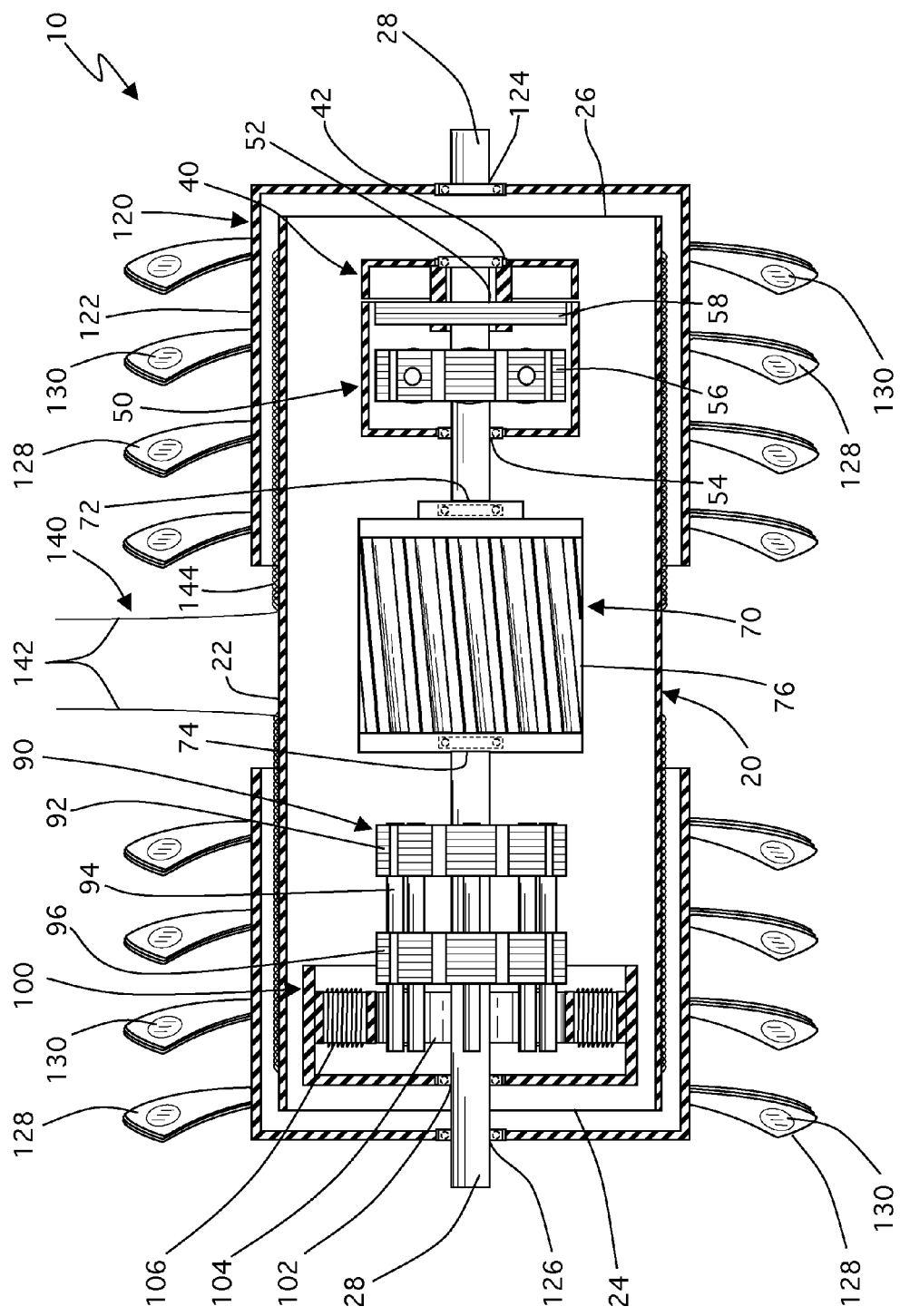
FIG. 3 is a cutaway side elevation view of the gravity driven hydroelectric system seen in FIG. 1.

As seen in FIGS. 1, 2, and 3, housing 20 comprises sidewall 22 having ends 24 and 26. Extending through housing 20, and specifically through ends 24 and 26 is shaft 28. Rotor housing assembly 40 comprises hole 42 to accommodate shaft 28. Field winding starter assembly 50 comprises holes 52 and 54 to accommodate shaft 28. Field winding starter assembly 50 further comprises field winding starter 56 having laminated steel rotor 58. Permanent magnet rotor assembly 70 is fixed upon shaft 28 and comprises holes 72 and 74 to accommodate shaft 28. Permanent magnet rotor assembly 70 further comprises permanent magnet rotor 76. Laminated steel rotor assembly 90 comprises laminated steel rotors 92 and 96 fixed upon shaft 28 and permanent magnets 94 that extend between them. Generator assembly 100 comprises hole 102, and armature 104 having wire coils 106.

Water turbine assembly 120 is fixedly mounted onto shaft 28, thereby rotating together. Water turbine assembly 120 comprises housing 122 having holes 124 and 126 to accommodate shaft 28. Water turbine assembly 120 further comprises turbine blades 128 having magnets 130 thereon that rotate over electro magnetic coils 144. Electrical system 140 comprises wires 142 that connect to terminals 166.

Figure 4:
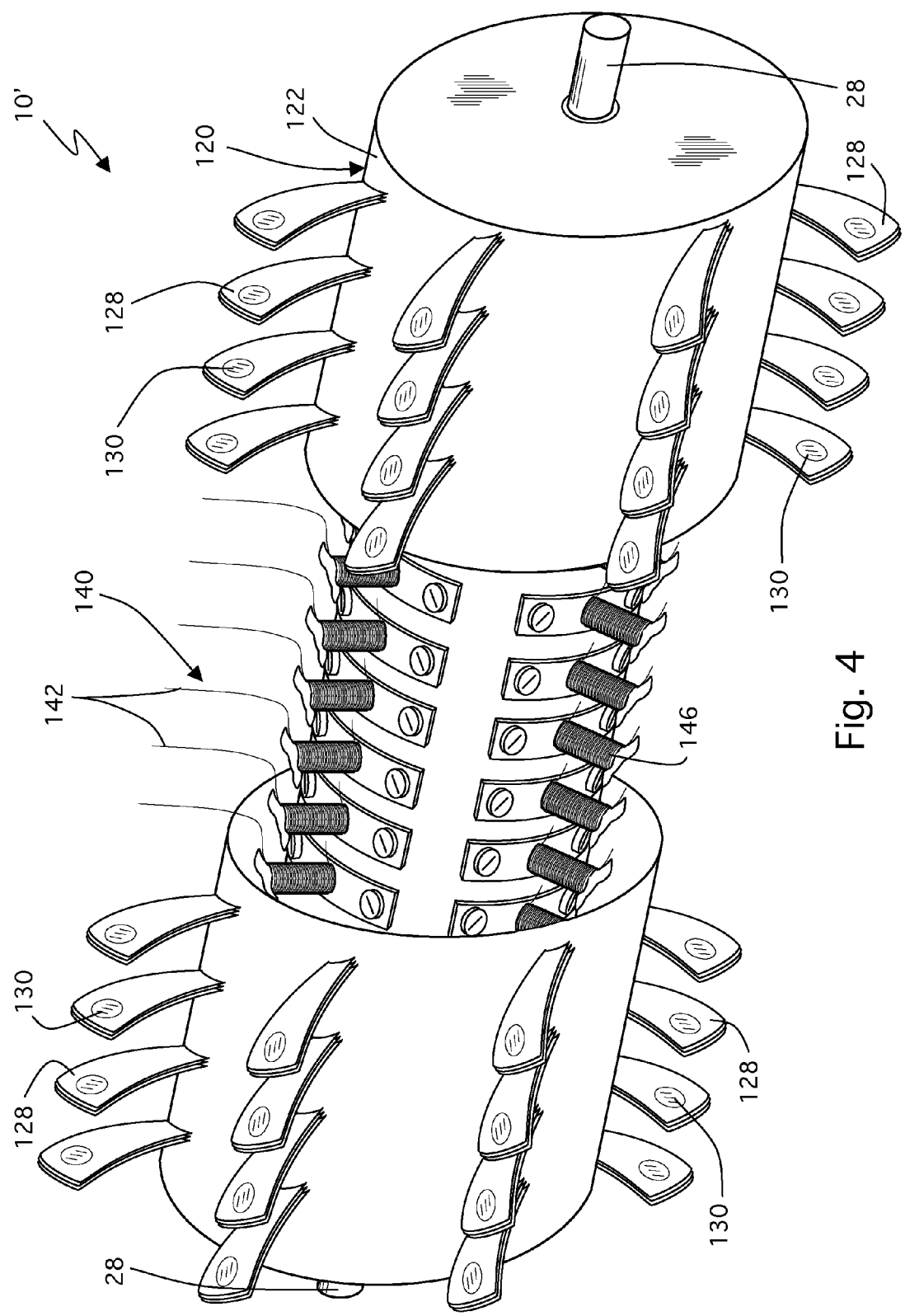
FIG. 4 represents an isometric view of an alternate embodiment gravity driven hydroelectric system.
Figure 5:
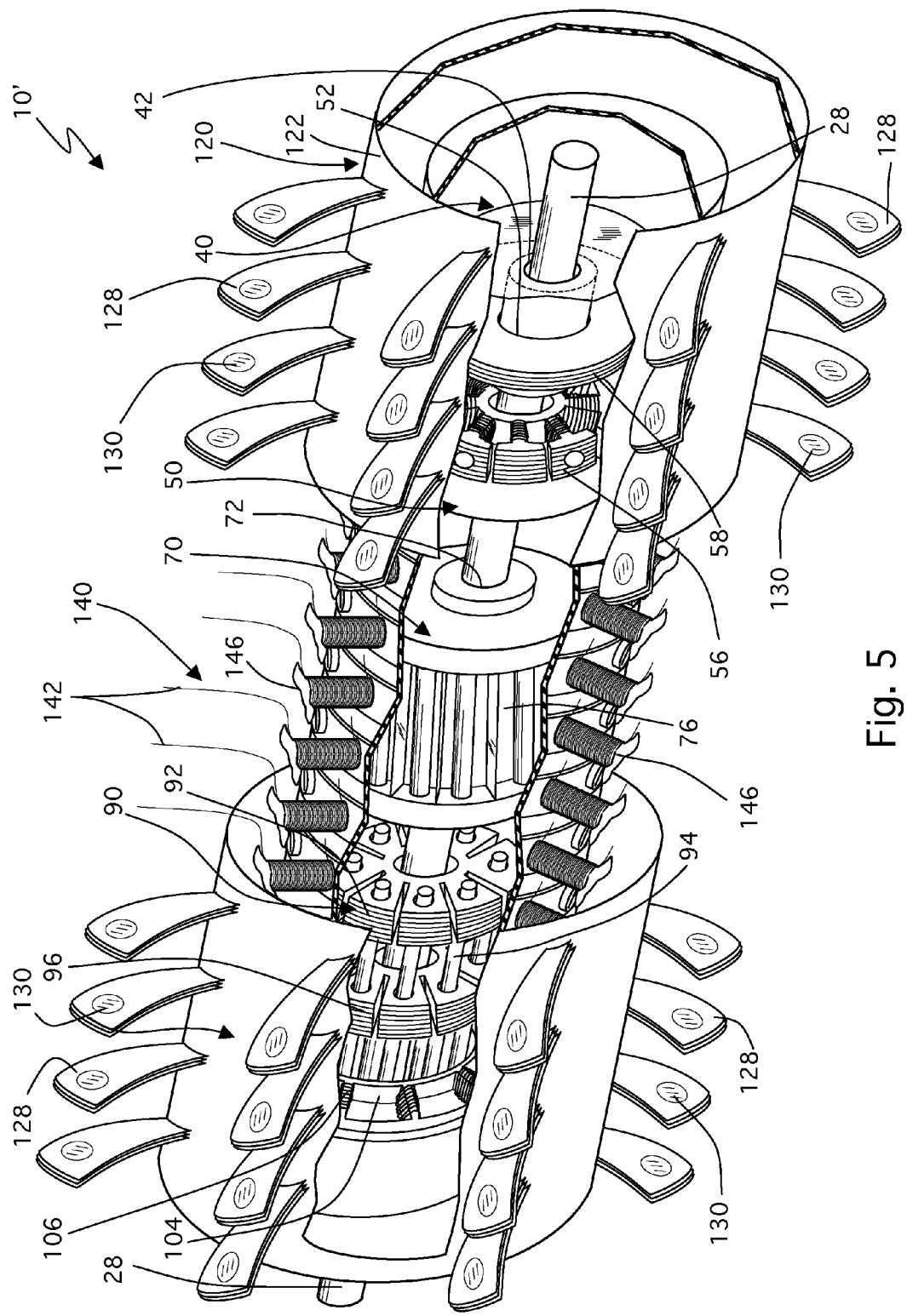
FIG. 5 is a cutaway perspective view of the alternate embodiment gravity driven hydroelectric system seen in FIG. 4.
Figure 6:
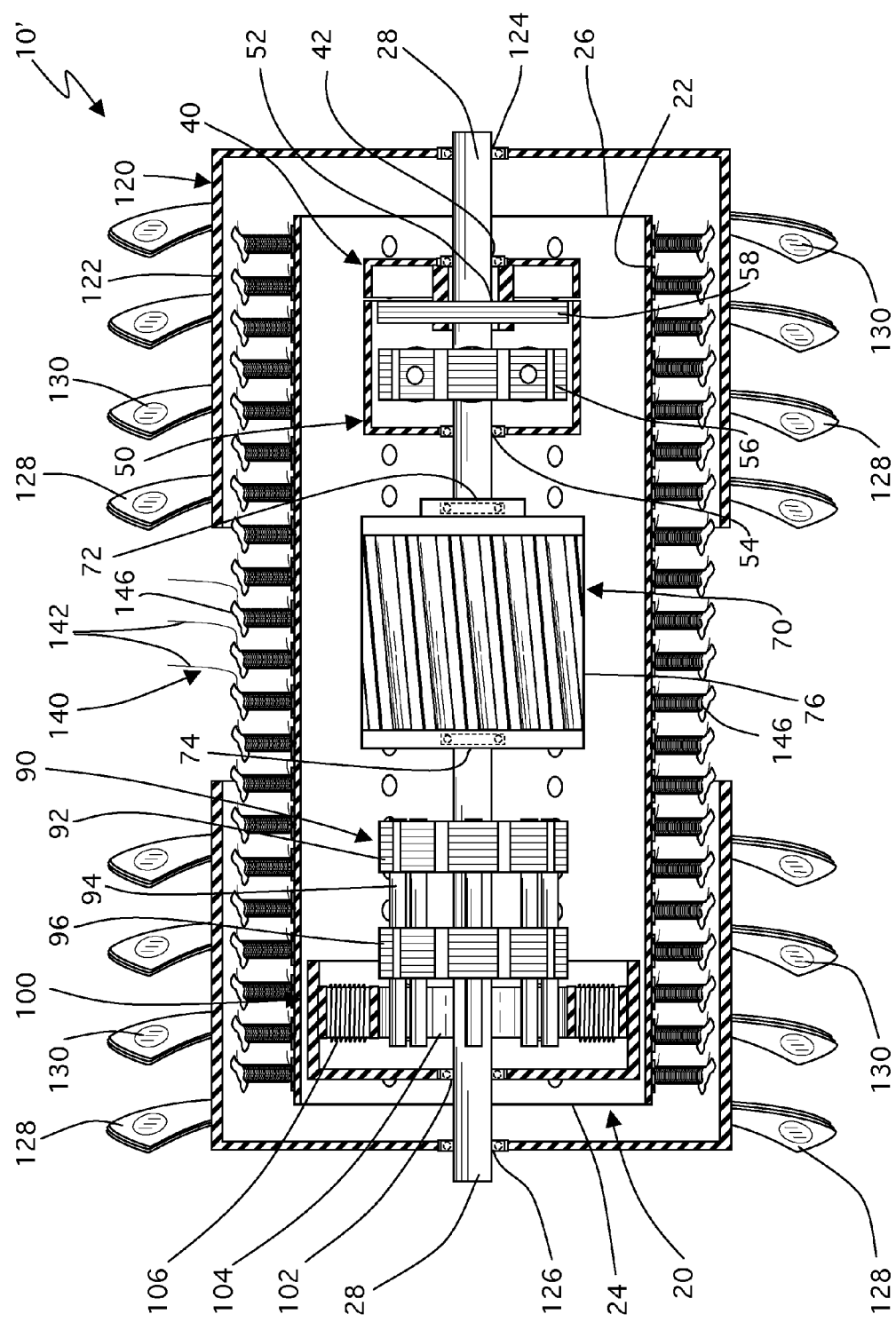
FIG. 6 is a cutaway side elevation view of the alternate embodiment gravity driven hydroelectric system seen in FIG. 4.

Seen in FIGS. 4, 5, and 6 is an alternate embodiment gravity driven hydroelectric system generally referred to with numeral 10'. Housing 20 comprises sidewall 22 having ends 24 and 26. Extending through housing 20, and specifically through ends 24 and 26 is shaft 28. Rotor housing assembly 40 comprises hole 42 to accommodate shaft 28. Field winding starter assembly 50 comprises holes 52 and 54 to accommodate shaft 28. Field winding starter assembly 50 further comprises field winding starter 56 having laminated steel rotor 58. Permanent magnet rotor assembly 70 is fixed upon shaft 28 and comprises holes 72 and 74 to accommodate shaft 28. Permanent magnet rotor assembly 70 further comprises permanent magnet rotor 76. Laminated steel rotor assembly 90 comprises laminated steel rotors 92 and 96 fixed upon shaft 28 and permanent magnets 94 that extend between them. Generator assembly 100 comprises hole 102, and armature 104 having wire coils 106.

Water turbine assembly 120 is fixedly mounted onto shaft 28, thereby rotating together. Water turbine assembly 120 comprises housing 122 having holes 124 and 126 to accommodate shaft 28. Water turbine assembly 120 further comprises turbine blades 128 having magnets 130 thereon that rotate over electro magnetic coils 146 that are mounted and protruding from sidewall 22. Electrical system 140 comprises wires 142 that connect to terminals 166.

Figure 7:
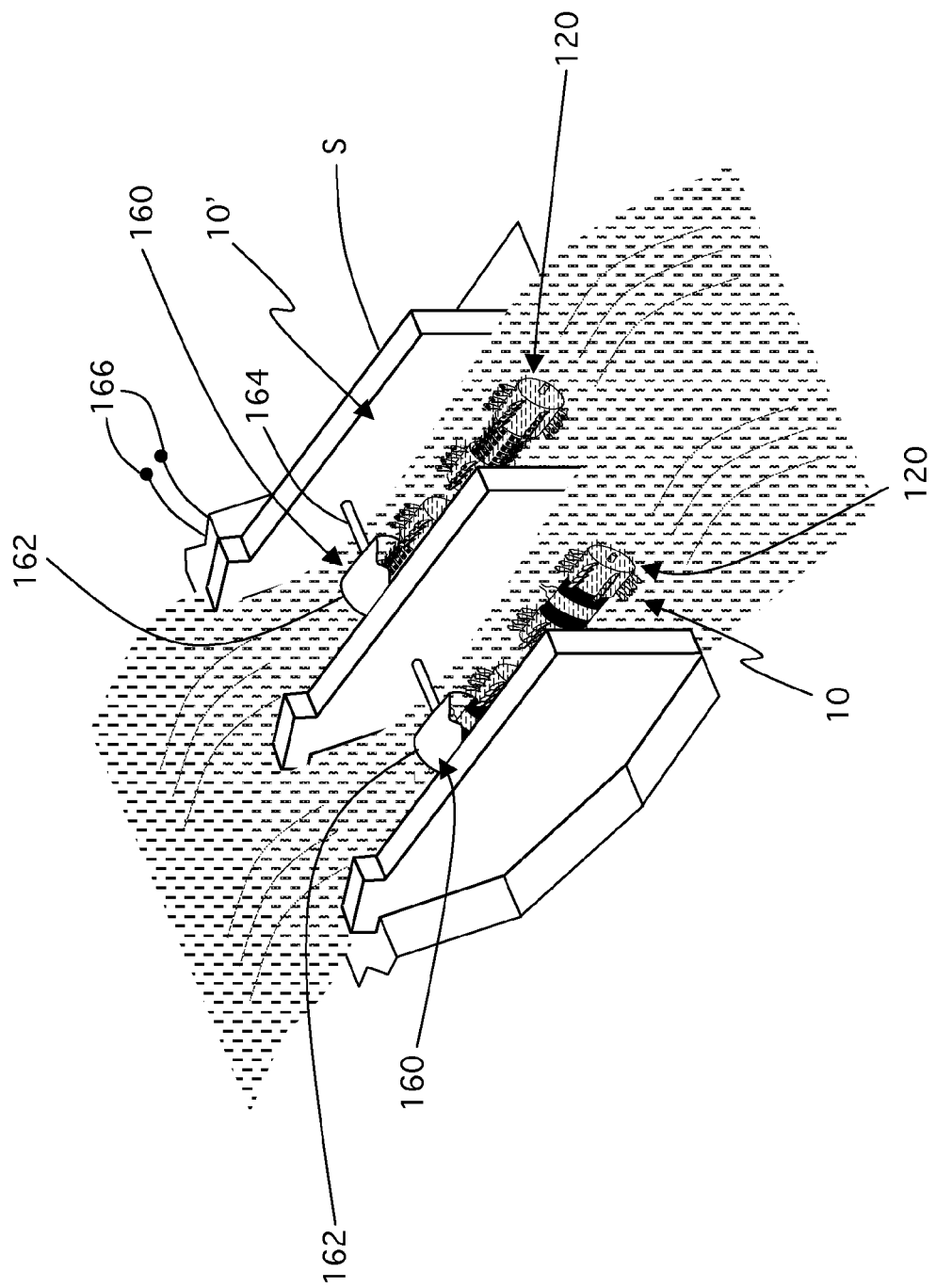
FIG. 7 is a perspective view of the present invention installed as a hydroelectric plant and producing hydroelectric power through the use of the gravitational force of falling or flowing water.

As seen in FIG. 7, present invention 10 develops hydroelectric power from the potential energy of dammed water driving water turbine assemblies 120. The power extracted from the water depends on the volume and on the difference in height between the source and the water's outflow. This height difference is called the head. The amount of potential energy in the water is proportional to the head. Penstock 160 delivers water to water turbine assemblies 120 that are within housings 162 secured by frame assemblies 164 to structure S. Each housing 162 comprises electromagnetic coils that also produce electricity from the rotation of respective turbine blades 128 having magnets 130 thereon. This electricity also connects to terminals 166.

Although not illustrated, it is understood that a pumped-storage method produces electricity to supply high peak demands by moving water between reservoirs at different elevations. At times of low electrical demand, the excess generation capacity is used to pump water into the higher reservoir. When the demand becomes greater, water is released back into the lower reservoir through turbine assemblies 120. Pumped-storage schemes may provide means of large-scale grid energy storage and improve a daily capacity factor of the generation system.

Also, and although not illustrated, it is understood that run-of-the-river hydroelectric stations are those with small or no reservoir capacity, so that the water coming from upstream must be used for generation at that moment through turbine assemblies 120, or must be allowed to bypass a dam.

Also, and although not illustrated, it is understood that a tidal power station makes use of a daily rise and fall of ocean water due to tides. Such sources are predictable, and if conditions permit construction of reservoirs, can also be dispatchable to generate power during high demand periods through turbine assemblies 120.

Also and although not illustrated, it is understood that less common types of hydro schemes use water's kinetic energy or undammed sources such as undershot waterwheels that may flow water to turbine assemblies 120.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A gravity driven hydroelectric system, comprising:
   A) a first housing comprising a sidewall having first and second ends, extending through said first housing is a shaft;
   B) a rotor housing assembly comprising a first hole to accommodate said shaft;
   C) a field winding starter assembly comprising second and third holes to accommodate said shaft, said field winding starter assembly further comprises a field winding starter having a first laminated steel rotor;
   D) a permanent magnet rotor assembly comprising fourth and fifth holes to accommodate said shaft, said permanent magnet rotor assembly further comprises a permanent magnet rotor;
   E) a laminated steel rotor assembly comprising second and third laminated steel rotors fixed upon said shaft and elongated permanent magnets, said elongated permanent magnets extend through said second and third laminated steel rotors;
   F) a generator assembly comprising sixth hole and an armature having wire coils;
   G) a water turbine assembly fixedly mounted onto said shaft, thereby rotating together, said water turbine assembly comprises a second housing having seventh and eighth holes to accommodate said shaft, said water turbine assembly further comprises turbine blades having magnets thereon; and H) an electrical system comprising wires that connect to terminals, whereby hydroelectric power is developed from potential energy of dammed water driving said water turbine assembly, said hydroelectric power extracted from said water depends on volume and on a difference in height between a source and an outflow of said water.

2. The gravity driven hydroelectric system set forth in claim 1, further comprising a penstock to deliver said water to said water turbine assembly, said penstock comprising a third housing secured by frame assemblies to a structure, said third housing comprises electromagnetic coils that also produce electricity from a rotation of said turbine blades having said magnets.

3. The gravity driven hydroelectric system set forth in claim 1, further characterized in that said turbine blades having said magnets thereon rotate over electro magnetic coils mounted from said sidewall.

4. The gravity driven hydroelectric system set forth in claim 1, further characterized in that said turbine blades having said magnets thereon rotate over electro magnetic coils mounted and protruding from said sidewall.

5. The gravity driven hydroelectric system set forth in claim 1, further characterized in that said rotor housing assembly, said field winding starter assembly, said permanent magnet rotor assembly, said laminated steel rotor assembly, and said generator assembly are contained within said first housing.

6. The gravity driven hydroelectric system set forth in claim 1, further characterized in that said rotor housing assembly is adjacent to said field winding starter assembly.

7. The gravity driven hydroelectric system set forth in claim 6, further characterized in that said field winding starter assembly is positioned in between said rotor housing assembly and said permanent magnet rotor assembly.

8. The gravity driven hydroelectric system set forth in claim 7, further characterized in that said permanent magnet rotor assembly is positioned in between said field winding starter assembly and said laminated steel rotor assembly.

9. The gravity driven hydroelectric system set forth in claim 8, further characterized in that said laminated steel rotor assembly is positioned in between said permanent magnet rotor assembly and said generator assembly.

10. A gravity driven hydroelectric system, consisting of:

A) a first housing comprising a sidewall having first and second ends, extending through said first housing is a shaft;

B) a rotor housing assembly comprising a first hole to accommodate said shaft;

C) a field winding starter assembly comprising second and third holes to accommodate said shaft, said field winding starter assembly further comprises a field winding starter having a first laminated steel rotor;

D) a permanent magnet rotor assembly comprising fourth and fifth holes to accommodate said shaft, said permanent magnet rotor assembly further comprises a permanent magnet rotor;

E) a laminated steel rotor assembly comprising second and third laminated steel rotors fixed upon said shaft and elongated permanent magnets, said elongated permanent magnets extend through said second and third laminated steel rotors;

F) a generator assembly comprising sixth hole and an armature having wire coils;

G) a water turbine assembly fixedly mounted onto said shaft, thereby rotating together, said water turbine assembly comprises a second housing having seventh and eighth holes to accommodate said shaft, said water turbine assembly further comprises turbine blades having magnets thereon; and H) an electrical system comprising wires that connect to terminals, whereby hydroelectric power is developed from potential energy of dammed water driving said water turbine assembly, said hydroelectric power extracted from said water depends on volume and on a difference in height between a source and an outflow of said water.

11. The gravity driven hydroelectric system set forth in claim 10, further characterized in that said rotor housing assembly, said field winding starter assembly, said permanent magnet rotor assembly, said laminated steel rotor assembly, and said generator assembly are contained within said first housing, said rotor housing assembly is adjacent to said field winding starter assembly.

12. The gravity driven hydroelectric system set forth in claim 11, further characterized in that said field winding starter assembly is positioned in between said rotor housing assembly and said permanent magnet rotor assembly.

13. The gravity driven hydroelectric system set forth in claim 12, further characterized in that said permanent magnet rotor assembly is positioned in between said field winding starter assembly and said laminated steel rotor assembly.

14. The gravity driven hydroelectric system set forth in claim 13, further characterized in that said laminated steel rotor assembly is positioned in between said permanent magnet rotor assembly and said generator assembly.

* * * * *